US012221267B2

(12) United States Patent
Rahmel et al.

(10) Patent No.: US 12,221,267 B2
(45) **Date of Patent: *Feb. 11, 2025**

(54) CONTAINER SYSTEM

(71) Applicant: Boehringer Ingelheim Vetmedica GmbH, Ingelheim am Rhein (DE)

(72) Inventors: Marcus Rainer Rahmel, Ockenheim (DE); Peter Bauer, Irmelshausen (DE); Guido Endert, Leichlingen (DE); Johannes Krieger, Mellrichstadt (DE); Philipp Ziegler, Unsleben (DE)

(73) Assignee: BOEHRINGER INGELHEIM VETMEDICA GMBH, Ingelheim am Rhein (DE)

( * ) Notice: Subject to any disclaimer, the term of this patent is extended or adjusted under 35 U.S.C. 154(b) by 798 days.

This patent is subject to a terminal disclaimer.

(21) Appl. No.: 17/220,953

(22) Filed: Apr. 2, 2021

(65) Prior Publication Data

US 2021/0221597 A1 Jul. 22, 2021

Related U.S. Application Data

(63) Continuation of application No. 16/029,763, filed on Jul. 9, 2018, now Pat. No. 10,968,026.

(30) Foreign Application Priority Data

Jul. 11, 2017 (EP) .................................... 17020294

(51) Int. Cl.

*B65D 81/32* (2006.01)
*A61J 1/14* (2023.01)
(Continued)

(52) U.S. Cl.

CPC ......... *B65D 81/3211* (2013.01); *A61J 1/1406* (2013.01); *A61J 1/2089* (2013.01);
(Continued)

(58) Field of Classification Search

CPC ........ A61J 1/2065; A61J 1/201; A61J 1/2027; A61J 1/2089; B01F 35/7137; B65D 91/3222; B65D 81/3216; B65D 81/3211
See application file for complete search history.

(56) References Cited

U.S. PATENT DOCUMENTS

| | | | |
|---|---|---|---|
| 5,170,888 | A | 12/1992 | Goncalves |
| 6,209,718 | B1 | 4/2001 | Mollstam et al. |

(Continued)

FOREIGN PATENT DOCUMENTS

| | | | |
|---|---|---|---|
| CA | 2 860 631 | A1 | 7/2013 |
| FR | 2921907 | A1 | 4/2009 |

(Continued)

*Primary Examiner* — Anthony D Stashick
*Assistant Examiner* — Raven Collins
(74) *Attorney, Agent, or Firm* — Calderon Safran & Wright P.C.; David S. Safran

(57) ABSTRACT

A container system having connection devices for establishing a fluid connection between the containers. In one aspect, a connection device comprises a thin point that, within its shape, has a tip between two at least substantially straight legs and wherein the other connection device has a ram with a splitting device that is designed and arranged such as to rupture said thin point by acting on the tip when the containers are coupled. In another aspect, the thin point surrounds the ram, and in a third aspect the connection devices have corresponding, similar thin points, closure elements and splitting devices. In further aspects, the connection devices are similar, and the connection devices are linearly guided.

15 Claims, 6 Drawing Sheets

(51) Int. Cl.

| | |
|---|---|
| ***A61J 1/20*** | (2006.01) |
| ***B01F 35/71*** | (2022.01) |
| *B01F 101/00* | (2022.01) |

(52) U.S. Cl.

CPC ........... *B01F 35/7137* (2022.01); *A61J 1/201* (2015.05); *A61J 1/2065* (2015.05); *B01F 2101/2202* (2022.01)

(56) References Cited

U.S. PATENT DOCUMENTS

| | | | | |
|---|---|---|---|---|
| 7,829,101 | B2 | 11/2010 | Eichmeyer et al. | |
| 11,026,863 | B2 | 6/2021 | Rahmel et al. | |
| 2016/0362236 | A1 | 12/2016 | Mühlemann | |
| 2017/0101252 | A1* | 4/2017 | Acott .................... | A47J 31/407 |

FOREIGN PATENT DOCUMENTS

| | | | |
|---|---|---|---|
| JP | S57126367 | U | 8/1982 |
| JP | 2014043258 | A | 3/2014 |
| WO | 2009133223 | A1 | 11/2009 |
| WO | 2011124946 | A1 | 10/2011 |

* cited by examiner

CONTAINER SYSTEM

CROSS-REFERENCE TO RELATED APPLICATIONS

This application is a continuation of commonly-owned, co-pending U.S. patent application Ser. No. 16/029,763 filed Jul. 9, 2018, which claims the benefit of priority to European Patent Application No. 17 020 294.9 filed Jul. 11, 2017, the contents of which are incorporated herein by reference in their entirety.

BACKGROUND OF THE INVENTION

Field of the Invention

The present invention relates to establishing a fluid connection between containers. In particular, the present invention relates to a container system, to a use and to a container.

Description of Related Art

In the medical field, it is often necessary to transport substances from one container to another. For example, drugs or substance mixtures are produced in a mixing bottle by first pouring the contents of one container into the mixing bottle followed by the contents of a second container, closing the mixing bottle and producing a mixture by moving the bottle.

In some cases, on which the present invention will also focus, it is necessary for substances stored in different containers to be mixed in sterile conditions or in a manner that prevents the entry of foreign substances. Therefore, the present invention relates in particular to establishing a continuous, sterile fluid connection between containers that is tight at least with respect to the surroundings, i.e. establishing a fluid connection while preventing the entry of foreign substances such as pathogens.

In this context, for example, International Application Publication WO 2013/104550 A1 and corresponding Canadian Patent Application CA 2860631 A1 disclose a kit for producing a combination vaccine, in which two bottles each comprise a septum, the kit comprising a double needle to perforate the two septa and thus establish a continuous fluid connection between the bottles. However, it has been noted that establishing a fluid connection by means of a double needle leads to unreasonably high flow resistance, which can make transfer between the bottles time-consuming.

SUMMARY OF THE INVENTION

Therefore, the problem addressed by the present invention is that of disclosing a container system, a use and a container by which the production of a mixture of the contents of the containers can be simplified, sped up and/or in which a particular mixing ratio can be ensured once the connection is established.

The problem is solved by a container system as described herein.

Firstly, the present invention relates to a container system having at least two containers. The containers each comprise an inner chamber for holding contents. When in an initial state, the containers are preferably separate from one another or produced separately or can be used separately and/or sealed separately.

The containers each comprise a connection device, specifically a first connection device of a first container and a second connection device of a second container of the container system.

The connection devices can be coupled together in such a way that the coupling produces a continuous fluid connection between the containers that is closed off from the surroundings. By means of this fluid connection, the inner chambers of the containers are interconnected such that contents that can be held in the inner chambers can be mixed. In other words, the continuous fluid connection allows the contents to be transferred between containers or from one container to the other such that the contents can be mixed.

Preferably, the one or more containers are bottles that comprise a bottle neck having a removal opening such as a septum, and the connection devices on the side opposite or facing away from the removal opening, i.e. on the base. However, other solutions are also possible in this case.

The first connection device comprises a thin point designed to rupture due to the action of a ram of the other or second connection device, as a result of which the fluid connection can be established. In other words, the containers assist a coupling process in which the ram of one connection device is used to perforate the thin point of the other connection device. Rupturing the thin point creates an opening, thereby producing or establishing the fluid connection. Specifically, the contents of one container can enter the inner chamber of the other container through this opening. In the process, the fluid connection is preferably sealed with respect to the surroundings such that no container contents can escape from the region of the fluid connection, which is or can be established by the connection devices, and/or no foreign bodies such as pathogens or the like can enter said region.

In a first aspect of the present invention, in its shape the thin point has a tip between two at least substantially straight legs. In addition, the ram comprises a splitting device that is designed and arranged such as to rupture the thin point by acting on the tip when the coupling is produced.

It has been noted that, when establishing fluid connections by rupturing a thin point, the opening process can be simplified if the thin point has the aforementioned tip in its shape. Firstly, relatively high shearing forces can be produced on the tip, making the initial rupture of the thin point simpler. In addition, the straight legs adjoining the tip allow the initial rupture of the thin point at the tip thereof to propagate to the straight legs adjoining the tip in an effortless manner, thereby making the overall opening process as effortless as possible or simpler for users.

In a second aspect of the present invention that can also be implemented independently, the first connection device comprises both the thin point and a ram for acting on the thin point of the second connection device. A container that has both the thin point and a ram is thus produced. In this case, the thin point of the first connection device has a portion surrounding part of the ram of the first connection device. In other words, the thin point surrounds, clasps or encompasses the ram.

This provides the advantage whereby the ram can push open a closure device of the other connection device by a greater amount than would be possible using a ram that is located outside a basic shape of a closure element or is not surrounded in part by the thin point.

The ram is preferably ridge-like and has a bottom adjoining the thin point. In the process, the thin point is preferably arranged around the bottom region of the ram. The thin point is preferably only arranged around part of the ram, and so another part of the ram is remote from the thin point. The portion surrounding part of the ram is in particular formed directly adjacently to the ram or the ridge forming the ram. Preferably, the ram protrudes into a closure region or into a basic shape of a closure element.

In another aspect of the present invention that can also be implemented independently, the connection devices each comprise a closure element delimited by a peripheral thin point and each comprise a ram having a splitting device and a pressure surface produced separately therefrom. In this case, the splitting device of the first connection device is arranged and designed such as to act on the thin point of the second connection device when the coupling is produced in such a way that the thin point ruptures at this point. In addition, the splitting device of the second connection device is arranged and designed such as to act on the thin point of the first connection device when the coupling is produced in such a way that said thin point ruptures. Moreover, the pressure surface of the first connection device is arranged and designed to push open the closure element of the second connection device when the coupling is produced. In addition, the pressure surface of the second connection device is designed and arranged to push open the closure element of the first connection device when the coupling is produced.

In other words, the two connection devices each comprise a closure element delimited by the peripheral thin point, and the two connection devices also each comprise a ram having a splitting device and a pressure surface. Furthermore, the thin points, splitting devices and pressure surfaces are arranged and designed such that, when the coupling is produced, i.e. when the connection devices are preferably slid or inserted into one another axially, the splitting devices rupture the thin points and the pressure surfaces preferably then push open the closure elements of the other connection device.

The proposed configuration can allow the two containers to be opened in the region of their connection devices in a quick and effortless manner. In addition, using the pressure surfaces permits a sufficiently large pivot angle for the closure elements, thereby increasing an opening cross section for the fluid connection. This consequently allows the container contents to be mixed quickly, reliably and completely.

In another aspect of the present invention that can also be implemented independently, the connection devices comprise guides for guiding coupling of the connection devices, the guides allowing the connection devices to be coupled only when they are in a predefined orientation relative to one another. Alternatively or additionally, the guides are configured for guiding the connection devices merely linear during coupling.

This provides the advantage that the connection devices might only the plugged into one another in an orientation, in which the ram of one of the connection devices in the connection process acts on the thin point of the other of the connection devices, such that this connection device is opened by rupturing the thin point. Accordingly, easy and fail save use can be achieved.

As described above, the thin point surrounds or encompasses part of the ram. In the process, it is also preferable for aligned portions of the thin point to abut this portion of the thin point encompassing the ram. The aligned portions are positioned on a common line or axis. This makes it possible for the aligned portions of the thin point to form a film hinge by which the closure element remains pivotally mounted once the thin point has ruptured.

The thin point preferably acts as a film hinge in the portions that lead away from the ram, such that the closure element is not completely detached but rather is or can be folded over and is held, preferably on a housing part of the container, a portion of the container wall and in particular on the container base, which can form a part of the connection device.

Apart from in the region around the ram, the thin point is preferably polygonal, i.e. has an overall polygonal shape. Preferably, the thin point has an odd number of corners, particularly preferably three or five corners.

Accordingly, the closure element delimited by the thin point can be triangular, or alternatively pentagonal, or polygonal, preferably having an odd number of corners. The thin point preferably completely envelops the closure element. Particularly preferably, the closure element is dimensionally stable or rigid, in particular is a closure plate or a plate-like closure element.

In order to generate a sufficiently large opening to establish the fluid connection, it is preferable and has proven particularly effortless to first produce a rupture at one of the corners of the thin point and to then cause the regions adjacent to the thin point to tear from said rupture.

The ram is preferably formed by a ridge. This ridge preferably extends at least substantially perpendicularly to a plane in which the thin point extends.

The ridge preferably has an elongate cross section, the longitudinal axis of which extends transversely to the aligned portions or to the region that forms the film hinge.

It is also preferable for the ridge to comprise the splitting device and/or the pressure surface on an open end face that can be facing away from or opposite the plane in which the closure element or thin point extends.

Particularly preferably, the open end face forms a V-shaped contour having two open ends that form the splitting device at one end and the pressure surface at the other.

In the process, the pressure surface of the first connection device is designed to push open the closure element of the other second connection device. For this purpose, the pressure surface can act, in particular push, on the closure element on the opposite side or, in other words, of the other second connection device during the coupling process, as a result of which the closure device can be pivoted and/or shear stress can be produced in the thin point delimiting said device; this promotes opening and helps achieve a sufficient opening cross section.

The ram is preferably held in a stationary manner on a side of the thin point facing away from the closure element. In particular, the ram is thus held on or secured to a housing part, a wall portion or base of the container or connection device, and particularly preferably is formed integrally therewith. Since the ram is stationary, it does not give way during the coupling process and can thus generate sufficient force on the thin point to split it, in particular pierce or perforate it, or the like.

Particularly preferably, the connection devices are formed so as to complement one another and/or are similar. In this regard, the two connection devices can each have thin points, preferably of the same shape, and a ram, preferably also of the same shape. They can also be located or arranged at corresponding, matching or complementary positions.

The thin points of the two connection devices are preferably each designed to rupture through the application of force by the ram of the other connection device, as a result of which the fluid connection can be established by opening the two containers, which were previously sealed separately at least in the region of the connection device.

In other words, the two connection devices each comprise a thin point that preferably delimits the closure elements. Furthermore, the two connection devices each comprise a ram for splitting the thin point of the other connection device. During coupling, the two connection devices are preferably opened and the fluid connection can be produced through the two openings.

The connection devices thus comprise thin points that extend in a similar manner and rams at corresponding positions. As a result, the connection devices are or can be reciprocally opened.

The coupling is carried out preferably—in particular exclusively—by moving the connection devices vertically towards one another. In particular, the connection devices are inserted into one another, slid into one another, placed on top of one another or moved in another way along a common coupling axis that preferably forms a central axis of the containers.

The coupling movement is preferably possible only when the connection devices are in a predefined orientation relative to one another and is impossible when they are oriented differently. In other words, the connection devices can be coupled together by movement along the coupling axis only when they are in an only one particular predefined orientation relative to one another. This can be achieved by the connection devices comprising complementary or corresponding guides or orientation aids which allow the containers to be coupled only when they are in the predefined orientation relative to one another and prevent the coupling when they are oriented differently.

As explained above, the basic shape of the thin points or closure elements is preferably angular having an odd number of corners, in particular triangular or pentagonal. Other solutions are also possible in this case.

The thin point(s) 5A, 5B preferably has/have a symmetry plane through tip 7A, 7B bisecting an edge of the thin point(s) 5A, 5B opposite the tip 7A, 7B.

Fundamentally, however, it is preferable for the shape of the thin point or the basic shape thereof and/or the shape or basic shape of the closure element to be asymmetrical in relation to a plane that is perpendicular to a connecting line between the tip and the splitting element. In this case, an asymmetrical basic shape teamed with the tip corner allows the fluid connection to be established in an effortless manner.

It is preferable for the ram or splitting element to act on the tip corner of the thin point during the coupling process. This can be achieved by the guides or orientation aids orientation means that set the orientation of the connection devices relative to one another for the coupling being provided in such a way that the ram/splitting element reliably strikes the thin point, preferably in the region of the tip corner, when the connection devices move towards one another along the common coupling axis.

By means of the guides, the container system preferably is configured that the connection devices can only be coupled together by moving along a coupling axis forming a central axis of the both connection devices when they are in the predefined orientation. Particularly preferably, there is only one specific orientation as regards potential orientations that can be achieved by rotating the connection devices relative to each other about the common central axis or coupling axis.

The predefined orientation preferably is fixed. The predefined orientation preferably is unique as well. Thus, the connection devices can only be coupled together in exactly one provided specific orientation, by plugging the connection devices together in a linear movement along the coupling axis while the connection devices having a fixed predefined rotary orientation about the coupling axis which can be predefined by the guides.

The guides preferably are complementary or corresponding in a manner that the guides predefine the orientation and do not allow the containers to be coupled when they are oriented differently.

Alternatively, or additionally, the guides form a linear guidance preventing rotational movement of the connection devices relative to each other during coupling of the connection devices. Thus, the coupling movement of the connection devices preferably is limited or forced to a merely linear movement along the coupling axis. Accordingly, the ram, tip or splitting device hit and perforate the thin point in order to establish the fluid connection in a reliable manner.

The guides preferably are configured for positive guiding, in particular by means of a groove or ridge at one of the connection devices, and a complementary part for sliding along the groove or ridge at the other one of the connection devices. Positive guiding in the sense of the present invention means positive locking of a rotary position or orientation while allowing linear movement along the coupling axis.

The orientation preferably is such that the ram of the second connecting device impinges the thin point of the first connection device when the connection devices are connected. The same preferably applies vice versa with the ram of the first connection device impinging the thin point of the second connection device.

Consequently, the connection devices preferably can be coupled by moving them in a direction towards each other along the coupling axis, which forms a central axis of the containers and of the connection devices, only when they are in a predefined orientation relative to one another, and are moved linearly towards each other, the connection devices comprising complementary guides which allow the containers to be coupled together only when they are moved linearly in the predefined orientation relative to one another while rotary movement relative to each other is blocked, and do not allow them to be coupled together when they are oriented differently.

In the predefined orientation, the projections of the thin points along the coupling axis preferably extend in a mirror image or inversely to one another. In particular, the triangular shaped thin points are in a mirror image or inverse regarding each other. This means in particular that symmetrically shaped thin points of the connection devices in the projection along the coupling axis or central axes are rotated 180° about the coupling axis or central axes. This results in tips of the thin points being arranged at opposite positions.

In the predefined orientation, projections of the rams along the coupling axis are preferably opposite from one another so as to be not in contact.

In the predefined orientation, projections of the thin points along the coupling axis preferably extend in a mirror image or inversely to one another. The thin points, which preferably intersect as a result of projection onto a common plane, thus comprise tips or corners positioned on opposite sides. The projections of the thin points thus preferably extend in opposite directions or are not on top of one another. The projections of the thin points preferably intersect in a plane that is perpendicular to an imaginary connecting line between the tips of the thin points and the rams or splitting elements. The projections of the thin points are preferably a mirror image of one another in relation to this plane.

The same preferably also applies to the rams projected onto the same plane along the coupling axis. Although the rams preferably do not intersect, they are preferably arranged and/or formed in a mirror image or inversely to one another centrally and perpendicularly to the connecting line between the tips and rams or splitting elements in the projection in relation to a plane. The projections of the rams are preferably offset from one another so as not to be in contact. The rams thus do not come into contact with one another when the coupling is produced and the connection devices are moved accordingly towards one another along the coupling axis.

It is also preferable for the splitting devices and the tips to coincide in the projection of the thin points and of the rams, as a result of which the splitting elements strike the opposite thin point in the region of the tip thereof during the coupling process and bring about the intended effect of initially splitting the thin point in this region.

An additional aspect of the present invention that can also be implemented independently relates to the use of the container system in the medical field.

In this case, it is preferable for a first container of the container system to comprise a first substance and for a second container of the container system to comprise a second substance. In the process, the first substance, the second substance or both substances preferably are or comprise a substance having a pharmacological effect, particularly preferably a vaccine against an illness.

In a particularly preferred variant, the first substance is a first vaccine against a first illness and the second substance is a second vaccine against a second illness different from the first.

Preferably, at least one of the containers comprises a removal opening for removing the contents of the container independently of the connection device. This may be a septum or another, preferably reversible closure.

In addition, the containers each comprise a connection device for establishing a fluid connection between the containers of the proposed container system. The containers are used together with the connection devices to produce a substance mixture, in particular for producing a combination vaccine for simultaneously vaccinating against different illnesses. For this purpose, the containers are interconnected by means of the connection devices such that a continuous fluid connection is formed between the inner chambers of the containers and the substances are mixed, in particular mixed by flowing together from one container into the other, optionally assisted by a movement of the interconnected containers. In this way, if the substances each comprise or form vaccines against at least one illness, a combination vaccine can be formed.

The proposed container system has proven particularly advantageous in relation to forming combination vaccines. In some cases, the substances or vaccines to be mixed are incompatible. In this case, a combination vaccine may only be possible if the substances/vaccines are mixed immediately before application. For stability and time efficiency reasons, this mixing process should be quick. For this purpose, the proposed container system is particularly advantageous since it assists rapid establishment of a continuous connection between the containers using simple means. In addition, a relatively large opening cross section between the containers is obtained; the fluid connection thus has a relatively large cross section of for example more than 2, 3, 5 or 6 $cm^2$. As a result, rapid transfer of the substances between the containers and rapid, complete and reliable mixing of the substances/vaccines are ensured.

An additional aspect of the present invention that can also be implemented independently relates to a container for a proposed container system. In this regard, the container system is designed to comprise two similar or identical containers that each have similar connection devices designed to act on one another in such a way that a fluid connection can be established between the containers by opening the containers.

In the process, the containers are separated and the connection devices of these containers can be coupled together by moving towards one another along the coupling axis in such a way that the coupling produces a continuous fluid connection that is closed off from the surroundings, this connection interconnecting the inner chambers of the containers in such a way that the contents that can be held in the chambers can be mixed.

The container for this container system comprises a guide that allows the containers to be coupled together only when they are in a predefined orientation relative to one another and prevents them being coupled together when they are oriented differently. Furthermore, the container is covered by a cap that preferably covers or protects the connection device. In this case, the guide prevents or limits a rotational movement of the cap. Alternatively or additionally, the guide forms a guide surface over which the cap can be or is moved away from the container by being rotated relative to the container.

The proposed container thus comprises a guide having a plurality of functions or actions, i.e. the function of predefining the orientation between a connection device of another container and the connection device of the container in question, the function of limiting the rotation of the cover cap so as to prevent damage to the connection device, in particular in the region of the ram, and/or the function of enabling the cap to be levered off in a helical manner as a result of the rotation so that said cap can be removed in an effortless manner. Once the cap has been removed, the each connection device is free and can be used to connect the containers of the container system in order to establish the continuous fluid connection.

A container system within the meaning of the present invention is preferably a system having at least two containers, in particular bottles, that each comprise an inner chamber. The inner chamber is preferably defined by a wall and can be shut off or provided with an opening. Particularly preferably, containers are in the form of bottles having a bottle neck and a closure such as a septum. Containers or bottles and/or connection devices within the meaning of the present invention are preferably at least substantially dimensionally stable, rigid or semi-rigid and/or are made at least substantially of plastics material or comprise plastics material, in particular polyethylene, HDPE, LDPE or polypropylene.

A bottle within the meaning of the present invention is preferably a sealed or sealable container for transporting and storing fluids, in particular liquids, gases and pourable solids such as powders. A bottle within the meaning of the present invention preferably has an end that tapers at least substantially conically also referred to as the bottle neck. The bottle neck preferably ends in an opening that has an in particular round cross section, is sealable and can be opened to remove contents also referred to as the removal opening. Bottles within the meaning of the present invention are preferably narrow neck bottles and/or vials. In narrow neck bottles, the diameter or clear width of the removal opening is smaller than the average internal diameter of the inner chamber/storage space formed by the bottle, preferably by less than 70%, in particular by less than 50%.

A connection device within the meaning of the present invention is preferably a device for establishing a fluid connection. In particular, said device is a fluid coupling, a flange, a coupling member, a mating member, a coupling, a plug, a male and/or female connector, in particular a plug-in connector, or a part thereof.

A connection device within the meaning of the present invention can be a portion/region of a container, in particular of a bottle, or the each connection device is connected to a container, in particular is bonded thereto, frictionally connected thereto and/or connected thereto in a form fit. Particularly preferably, the connection device is formed by or is integral with the container or bottle or the wall thereof. Alternatively or additionally, the connection device adjoins a container or bottle or is otherwise capable of linking or connecting the inner chamber of the container or bottle for fluid communication and/or for sealing said chamber against fluid communication.

When in an initial state, the connection device is preferably sealed against fluid communication and thus forms a continuous wall, whereas, in the coupling state or the state in which the fluid connection is produced, the connection device is open or has or forms a wall breach. In other words, the connection device is an opening that is initially closed and then opened by the coupling being produced, and subsequently forms an opening through which the fluid connection is established or provided.

The opening process is preferably irreversible, the each connection device thus being able to be opened just once or in an irreversible manner. This is carried out in the region of the thin point by destroying the thin point. The thin point is made to tear and the opening is thus produced, in particular by the connection device being severed and a wall portion in the region of the connection device consequently detaching the closure element being the wall portion.

Preferably, the connection devices can be fitted into one another. This means that a part or portion of one of the connection devices can be arranged or fitted within the other connection device or within a part of portion thereof. In particular, at least one portion of one of the connection devices can be slid, placed, fitted or otherwise introduced into the other or corresponding connection device.

Connection devices are deemed fitted into one another in particular when they radially overlap each other at least in part, substantially and/or completely in relation to a common axis of symmetry and/or central axis, or when an inner portion of one connection device is completely surrounded or covered radially by an outer portion of the other connection device. In this case, the connection devices are preferably sealed with respect to one another in such a way that a part that is enveloped by the connection devices and also forms the fluid connection is separated from the surroundings. This seal is preferably water-tight, gas-tight and/or bacteria-tight. This prevents germs or other foreign material entering once the fluid connection is established.

A thin point within the meaning of the present invention is preferably a region in a wall of the container or connection device, in particular in the base region, having a reduced material thickness. The thin point can thus be a wall portion having a material thickness that is significantly less, e.g. by a factor of more than 5 or 10, than the material thickness of the wall adjacent to the thin point. In this case, the thin point is preferably designed to tear when loaded. The material thickness of the thin point is thus reduced to such an extent that a mechanical load leads to the thin point tearing. In this respect, the thin point is a predetermined breaking point. The thin point is preferably linear or forms or is a predetermined breaking line.

As explained above, the thin point can form a film hinge at least in some portions. For this, the material thickness does not have to be different from the rest of the thin point and can thus be at least substantially the same. The critical factor for whether the thin point forms a film hinge or tears is the shape and/or direction of the load thereon during the coupling process.

As a result, the thin point is thus a material weakness resulting from a reduction in the material thickness, meaning that the thin point is fragile, preferably such that the thin point ruptures when mechanically loaded so as to produce an opening or be able to establish the fluid connection. In the coupling process, portions of the thin point that are not loaded with shearing forces or are hardly loaded then preferably form the film hinge.

The thin point preferably has material thickness of less than 150 μm preferred or 100 μm, preferably less than 70 μm, in particular less than 50 μm and/or more than 5 μm, in particular more than 10 μm, 20 μm or 50 μm, particularly preferably more than 100 μm. As a result, the thin point is made sufficiently fragile to establish the fluid connection by splitting rupture when small forces are exerted, and the thin point is given a material thickness that is thick enough to prevent contents of the containers escaping and to remain intact in the event of slight shocks when the connection device/ram of the other connection device is not acting on it.

A ram within the meaning of the present invention is preferably a device designed to create an opening, in particular to push open a closure element and/or to have an opening effect on the thin point such that it ruptures. For this purpose, a ram within the meaning of the present invention is preferably ridge-like or pin-like and/or arranged and designed such that a pressure or shear stress can be exerted on the thin point or closure element of the connection device on which the ram acts during the coupling process.

The ram preferably comprises a splitting device, which can be formed as a cutting edge, a spike or the like. In addition, the ram preferably comprises the pressure surface. The cutting edge and the pressure surface can form separate parts of the ram. The ram is preferably a ridge that carries both the splitting device and the pressure surface. In principle, the ram is a single piece but can also be formed in a plurality of pieces. It is preferable, however, for the splitting device and the pressure surface to be rigidly interconnected. Preferably, however, the splitting device and the pressure surfaces are connected by the ridge that forms the ram, the pressure surfaces and the splitting device.

Alternatively, or additionally rams might have no splitting device but being configured merely to push further open the closure element.

A movement along the coupling axis is preferably a movement that is not helical or rotational and is at least substantially or only linear and/or only axial. The connection devices can thus preferably be inserted, fitted and/or plugged into one another at least substantially linearly.

Within the meaning of the present invention, a pressure surface is preferably a surface of the ram designed and arranged to press on a closure device of the opposite connection device in order to open said connection device, widen the opening or move the closure element, and/or to apply force, in particular shearing force, to the thin point in order to cause said thin point to tear.

A film hinge, also referred to as a solid hinge, is a region of an integral part in which elastic deformation of the material is made simpler by a reduction in the material thickness, such that pivotal mounting is provided in the region of the film hinge. In the present invention, the film hinge is preferably formed by the thin point.

When coupling has taken place, the connection devices preferably generate a fluid connection, in particular by means of sealing lips and/or directly adjacent ridges and/or wall portions, in the sense of a passage between two container inner chambers that is sealed with respect to the surroundings. The connection is preferably sealed with respect to the surroundings in a self-sealing manner, i.e. without any separate aids, in other words by the connection devices themselves and/or fully automatically, incidentally or without the need for separate steps.

Particularly preferably, a sterile seal with respect to the surroundings is produced; the combination of the connection devices is thus preferably self-sealing in a sterile manner A sterile seal produced in the process means that a barrier against the entry of germs such as bacteria or viruses from the surroundings is formed such that germs are at least substantially prevented from entering and/or escaping. In particular, seals, a seal clearance and/or a contact pressure between adjacent portions of the connection devices are designed such that any potential remaining leaks have a maximum cross section that blocks the passage of germs such as bacteria or viruses or at least forms a barricade thereto.

Within the meaning of the present invention, a fluid connection is preferably a fluid passage, i.e. a device or arrangement designed to allow a fluid, in particular a liquid, gas or flowable solid, to flow therethrough. In particular, the connection is a through-flow region, a connection or a channel that is preferably tightly sealed with respect to the surroundings or a side of a wall forming the passage that faces away from the passage.

Aligned portions are preferably portions that extend on the same straight line or axis.

Within the meaning of the present invention, closure elements are preferably parts or portions, in particular of a wall, that seal the container inner chamber against the escape of contents when in an initial state but can also open the container in order to allow the container contents to escape or pass, preferably through the wall of the container open state or connected state. A closure element within the meaning of the present invention thus closes the container when in an initial state and allows access to the inner chamber when in an open state. In particular, the element is a closure cap, a plate-like part or the like. Particularly preferably, the closure element is a wall portion of the container that is connected to a surrounding wall by means of a thin point.

Further aspects, advantages and features of the present invention will become apparent from the following description of a preferred embodiment in conjunction with the accompanying drawings.

DETAILED DESCRIPTION OF THE INVENTION

Figure 1:
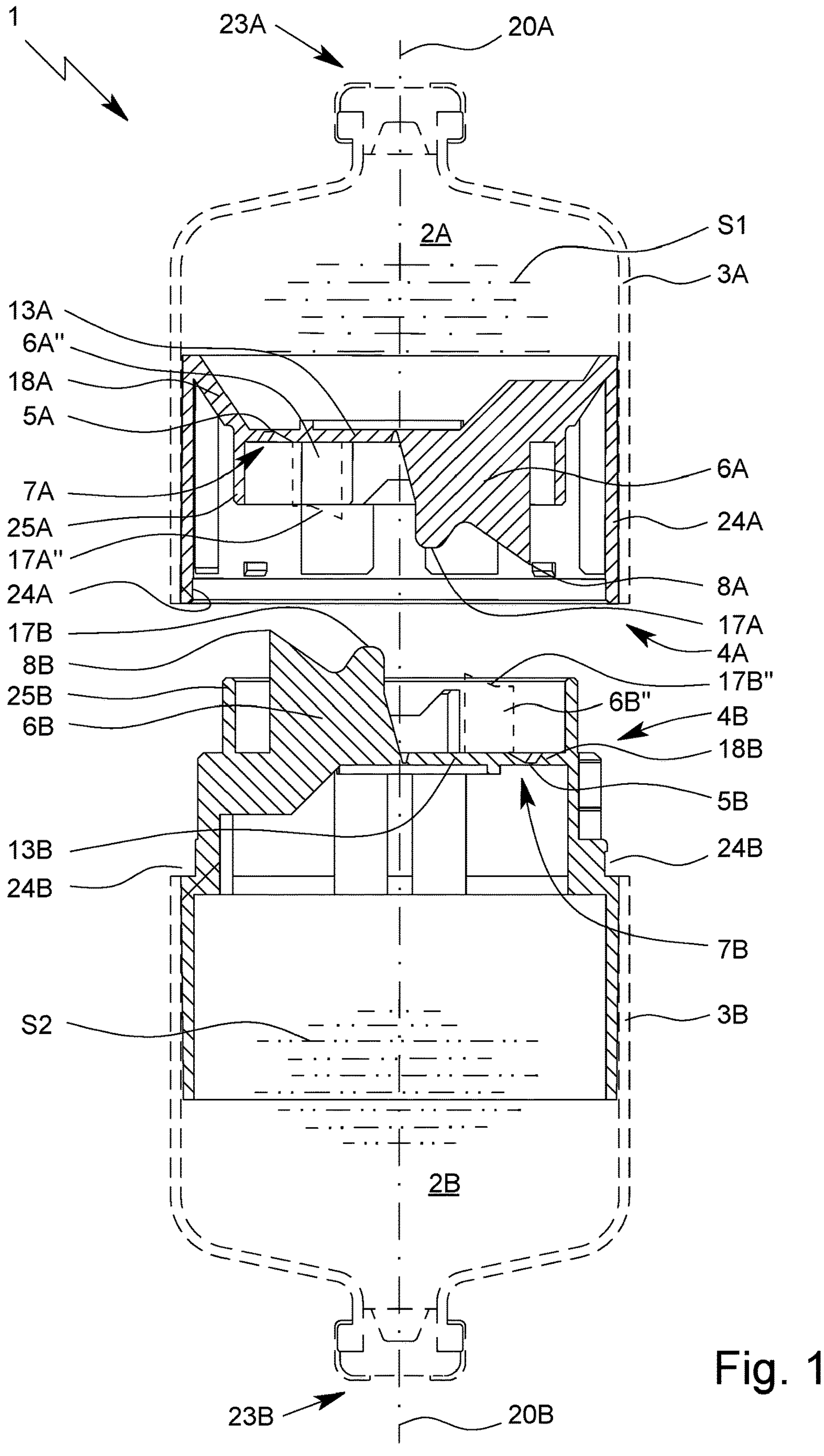
FIG. 1 is a schematic section through the connection devices arranged relative to one another before the connection is established.

In the drawings, the same reference numerals are used for identical or similar parts, and corresponding advantages and properties can be achieved even if the description thereof is not repeated.

Corresponding or matching parts and elements will be denoted by the same numeral in the following, but with either letter A or letter B. Therefore, unless specified otherwise, the same features and properties apply to such corresponding parts, even if this is not explicitly set out or mentioned. If, however, other parts are necessary and/or are described in certain aspects of the invention, this does not mean that corresponding parts or elements have to be implemented on both sides, though this is preferable.

FIG. 1 is a schematic section through a proposed container system 1 in an uncoupled state, comprising two containers 3A, 3B each forming inner chambers 2A, 2B.

The containers 3A, 3B each comprise a connection device 4A, 4B, specifically a first connection device 4A of a first container 3A and a second connection device 4B of a second container 3B. These connection devices 4A, 4B are shown in a perspective view in FIGS. 2 and 3.

In some cases in the following, mechanisms will be described for one connection device only or for opening only one of the connection devices 4A, 4B. It is possible to implement only the required components and effects and to omit other components, even if they are shown in the embodiment. For example, it is possible for just one of the containers 3A, 3B to be sealed and opened or able to be opened by a connection device 4A, 4B.

However, it is preferable for each connection device 4A, 4B to be designed in a corresponding manner and/or to achieve corresponding effects, even if this is not explicitly mentioned below. Therefore, corresponding explanations given below in relation to the first connection device 4A or parts thereof preferably also or accordingly apply optionally to the second connection device 4B and vice versa, unless explicitly stated otherwise. However, this does not mean that the connection devices 4A, 4B must be constructed in a corresponding or identical manner, even if this would be advantageous. It is thus fundamentally possible to implement only those features described in a specific context, even if the other connection device 4A, 4B does not have corresponding features.

The connection devices 4A, 4B can be coupled together such that the coupling produces a continuous fluid connection that is closed off from the surroundings and interconnects the inner chambers 2A, 2B of the containers 3A, 3B in such a way that contents that can be held in the inner chambers 2A, 2B can be mixed. In other words, when in an initial state, the containers 3A, 3B are preferably sealed in the region of the connection devices 4A, 4B such that no contents can escape, and the connection devices 4A, 4B can form a passage between the containers 3A, 3B by means of the coupling such that the inner chambers 2A, 2B are interconnected and contents can be exchanged between the containers 3A, 3B.

In principle, the container system 1 is designed to allow the containers 3A, 3B to be coupled by means of the connection devices 4A, 4B such that the inner chambers 2A, 2B of said containers are interconnected.

With reference to the embodiment according to FIG. 1, this is achieved by a relative movement of the connection devices 4A, 4B towards one another, one of the connection devices 4A, 4B comprising a thin point 5A, 5B on which the other, second connection device 4B acts by means of its ram 6B in order to rupture said point and thus establish the fluid connection.

In the examples shown, the connection devices 4A, 4B are designed at least substantially identically or similarly.

The each thin point 5A, 5B forms or delimits a region, in particular a wall portion of the container 3A, 3B, that initially seals the relevant container 3A, 3B but is designed to rupture the relevant thin point 5A, 5B in order to produce an opening through which the fluid connection is established or provided.

The connection device 4A preferably comprises a thin point 5A. As explained above, the thin point can be sufficiently fragile to be ruptured in order to obtain an opening. The thin point is thus in particular a predetermined breaking point or predetermined breaking line.

In its shape, the thin point 5A comprises a tip 7A that is arranged or formed between two at least substantially straight legs 14A. The tip 7A has proven advantageous for producing a region of the thin point 5A since the thin point 5A ruptures or tears in a preferable or particularly simple manner, thus making it simpler to open the first connection device 4A.

The tip 7A is preferably formed such that the thin point 5A undergoes a change in direction and/or an angle αA of less than 120° is formed between the straight legs. However, it is more preferable to have a directional change about more than 90° or an angle πA of less than 90° to be formed. In the example shown, the angle πA formed is less than 50° and/or more than 30°, in particular approximately 46°.

As explained above, the same preferably applies to a tip 7B of the second connection device 4B and/or to at least substantially straight legs 14B of the connection device 4B.

The ram 6B of the second connection device 4B comprises a splitting device 8B designed and arranged to rupture the thin point 5A of the first connection device by acting on the tip 7A when the coupling is produced.

The ram 6B is preferably a ridge-like and/or protruding portion. The ram 6B is preferably designed to be pushed onto the thin point 5A of the first connection device 4A upon coupling and to perforate, pierce or cut open said point. In addition, the ram 6B is preferably designed to be arranged in the opening that is formed as a result. During the coupling process, the ram 6B thus preferably penetrates the region that was previously formed or closed by the thin point 5A of the first connection device 4A.

In the example shown, the splitting device 8B is preferably formed as a spike and/or a cutting edge. In the process, the splitting device 8B preferably corresponds, in particular in terms of shape and/or size, to the thin point 5A in the region of the tip 7A, is complementary thereto or formed in a corresponding manner.

The same preferably applies to a ram 6A or a splitting device 8A of the first connection device 4A, the splitting device 8A of the ram 6A of the first connection device 4A thus preferably being designed and arranged such that, when the coupling is produced, the thin point 5B of the second connection device 4B ruptures through the application of force on the tip 7B of the second connection device 4B.

Moreover, at least one of the connection devices 4A, 4B, for example the first connection device 4A, comprises a thin point 5A designed to rupture through the application of force by a ram 6B of the other, second connection 4B device, as a result of which the fluid connection can be established. Preferably, the same applies to the second connection device, which in the example shown also comprises a thin point 5B designed to rupture through the application of force by a ram 6A of the first connection device 4A, as a result of which the fluid connection can be established.

Particularly preferably, the connection devices 4A, 4B, the thin points 5A, 5B and/or the rams 6A, 6B are designed such that the connection devices reciprocally open during the coupling process, and specifically by the ram 6A, 6B of the connection device 4A, 4B acting on the thin point 5A, 5B of the other connection device 4A, 4B, causing it to rupture, as a result of which the two connection devices 4A, 4B are opened and a continuous fluid connection is obtained between the container inner chambers 2A, 2B.

The thin point 5A preferably surrounds, more preferably at least substantially completely surrounds, a preferably plate-like closure element 13A of the first connection device 4A.

In the process, the closure element 13A is preferably at least substantially dimensionally stable and/or rigid. The closure element 13A can be made of the same material as the thin point 5A, and in particular can be formed integrally with the thin point 5A, the thin point 5A being recessed with respect to the closure element 13A by means of a material weakness in the form of a reduced material thickness.

The same preferably applies to a preferably plate-like closure element 13B of the second connection device 4B.

The connection devices 4A, 4B are preferably designed such that, when the coupling is produced, the ram 6B of the second connection device 3B acts on the closure element 13A of the first connection device 4A such that the thin point 5A ruptures, in particular tears, along the legs 14A starting from the tip 7A. In addition, the thin point 5A is preferably first ruptured in the region of the tip 7A, preferably by the splitting device 8B, and the ram 6B then acts on the closure element 13A such that the opening is widened by the thin point 5A tearing open from the tip 7A. As a result, the closure element 13A is gradually detached and is moved such that the opening is formed or widened.

The same connection device 4A, 4B explained in more detail below on the basis of the first connection device 4A preferably comprises both the thin point 5A and a ram 6A for acting on a thin point 5B of the other or second connection device 4B. Therefore, in this aspect of the present invention, which can also be implemented independently, at least one of the connection devices 4A, 4B is provided with both the ram 6A, 6B and the thin point 5A, 5B, the other connection device 4A, 4B having at least the thin point 5A, 5B but not necessarily the ram 6A, 6B though this is preferred.

The thin point 5A of the first connection device 4A preferably comprises a portion 9A that surrounds part of the ram 6A of the first connection device 4A. Preferably, the ram 6A protrudes into the basic shape of the closure element 13A, although the thin point 5A follows the shape of the ram 6A and surrounds or encompasses the bottom region of the ram 6A as a result.

Preferably, the thin point 5A extends, in a straight manner in at least some portions, on different sides of the ram 6A and/or on a side of the closure element 13A opposite the tip 7A. Particularly preferably, aligned portions 10A, 11A of the thin point 5A adjoin the side of the ram 6A. These can directly adjoin the portion 9A surrounding the ram 6A. The portions 10A, 11A are preferably aligned with one another and are thus on a common straight line or axis in the space also referred to as the alignment 16A.

The aligned portions 10A, 11A of the thin point 5A preferably form a film hinge. This can be provided or carried out by the closure element 13A remaining hanging in the aligned portions 10A, 11A after the thin point 5A has ruptured, and being pivotally mounted or hinged by deforming the thin point 5A.

In the example shown, the thin point 5A tears along the legs 14A, starting from the tip 7A, only as far as to the corners 12 adjacent to the aligned portions 10A, 11A. However, the thin point 5A does not tear any further into the aligned portions 10A, 11A since a pressure exerted by the ram 6B, in particular on the closure element 13A, only leads to excessive shear stress in other regions, and in the aligned portions merely causes deformation, in particular warping, of the thin point 5A along a bending line bent transversely or perpendicularly to the shape of the thin point 5A.

In the example shown, the aligned portions 10A, 11A are provided both on the side of the closure element 13A opposite the tip 7A and adjacently to the side of the ram 6A. However, it is also conceivable in principle in an alternative not shown for the aligned portions 10A, 11A to be arranged, regardless of the position of the ram 6A, on a side of the closure element 13A opposite or facing away from the tip 7A or corner 12, or on the basic shape formed by the thin point 5A.

It is also conceivable to provide just one aligned portion 10A, 11A, which can be formed by the aligned portions 10A, 11A or replaces them. Preferably, however, the aligned portions 10A, 11A are separated from one another by the ram 6A or the portion 9A surrounding the ram 6A.

In the example shown, in the direction of a plane formed by the thin point 5A at the tip 7A, the tip 7A of the thin point 5A has a width or extension that is larger than the rest of the thin point 5A. The thin point 5A thus has an increased surface area at the tip 7A. As a result, it is simpler to split the thin point 5A in the region of the tip 7A.

In the region of the tip 7A, the closure element 13A comprises a chamfer that extends at a shallower angle to the thin point 5A than in other regions in which the closure element 13A adjoins the thin point 5A. This makes it possible for the splitting element 8B to be formed in the shape of a wedge, without it colliding with the closure element 13A during the coupling. As a result, sufficient stability in the splitting element 8B or ram 6B can be achieved.

The legs 14A are preferably at least substantially the same length. The basic shape of the thin point 5A or closure element 13A can thus be a triangle or polygon of which the legs 14A are the same length starting from the tip 7A.

It is also preferable for the closure element 13A to be symmetrical in relation to a plane formed by the tip 7A and the ram 6A perpendicularly to the main plane of extension of the closure element 13A.

The basic shape of the closure element 13A or basic shape formed by the thin point 5A apart from the portion 9A surrounding the ram 6A, preferably comprises a planar side that is opposite the tip 7A and forms the film hinge or the aligned portions 10A, 11A.

In the example shown, the ram 6 is formed by an elongate, planar or plate-like ridge. This is advantageous in that a sturdy construction can be produced with efficient use of materials. However, other solutions are also conceivable in principle.

The ram 6A preferably has an elongate cross section, the longitudinal axis 15A of which extends transversely to the alignment 16A of the aligned portions 10A, 11A. In other words, the ram 6A is preferably plate-like having a main extension along the longitudinal axis 15A along which it preferably protrudes into the basic shape of the closure element 13A or thin point 5A. The ram 6A preferably projects or protrudes transversely thereto, preferably relative to a surface or plane in which the closure element 13A or thin point 5A extends.

The ram 6A thus preferably extends on a side facing away from the inner chamber 2A and in a direction facing away from the inner chamber 2A. As a result, the ram 6B can act on the thin point 5B of the other connection device 4B when the connection devices 4A, 4B move relative to one another in order to establish the fluid connection.

The ridge forming the ram 6A preferably has an open end face, preferably on the side facing away from the inner chamber 2A, 2B of the container 3A, 3B that comprises the respective connection device 4A, 4B. In the example shown, the connection devices 4A, 4B each form a base of the container 3A, 3B. The ram 6A, 6B is formed such as to protrude externally from the base, in particular is formed by the aforementioned ridge.

The open end face of the ram 6A, 6B preferably forms a V-shaped contour having two open ends that form the splitting device 8A, 8B at one end and, at the other end, a pressure surface 17A, 17B for pushing open the closure element 13A, 13B of the other connection device 4A, 4B.

Figure 2:
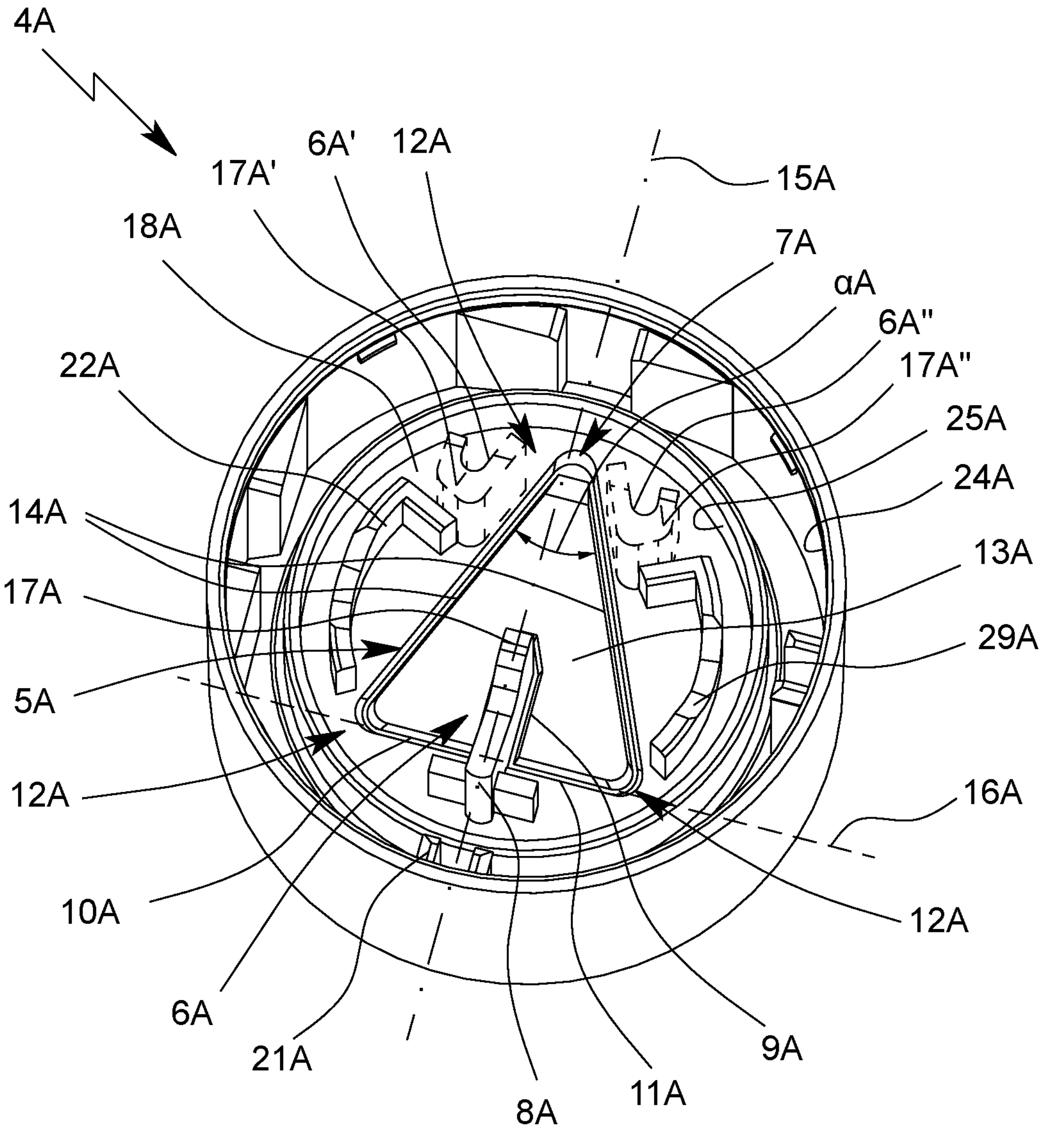
FIG. 2 is a schematic perspective view of a first connection device.
Figure 3:
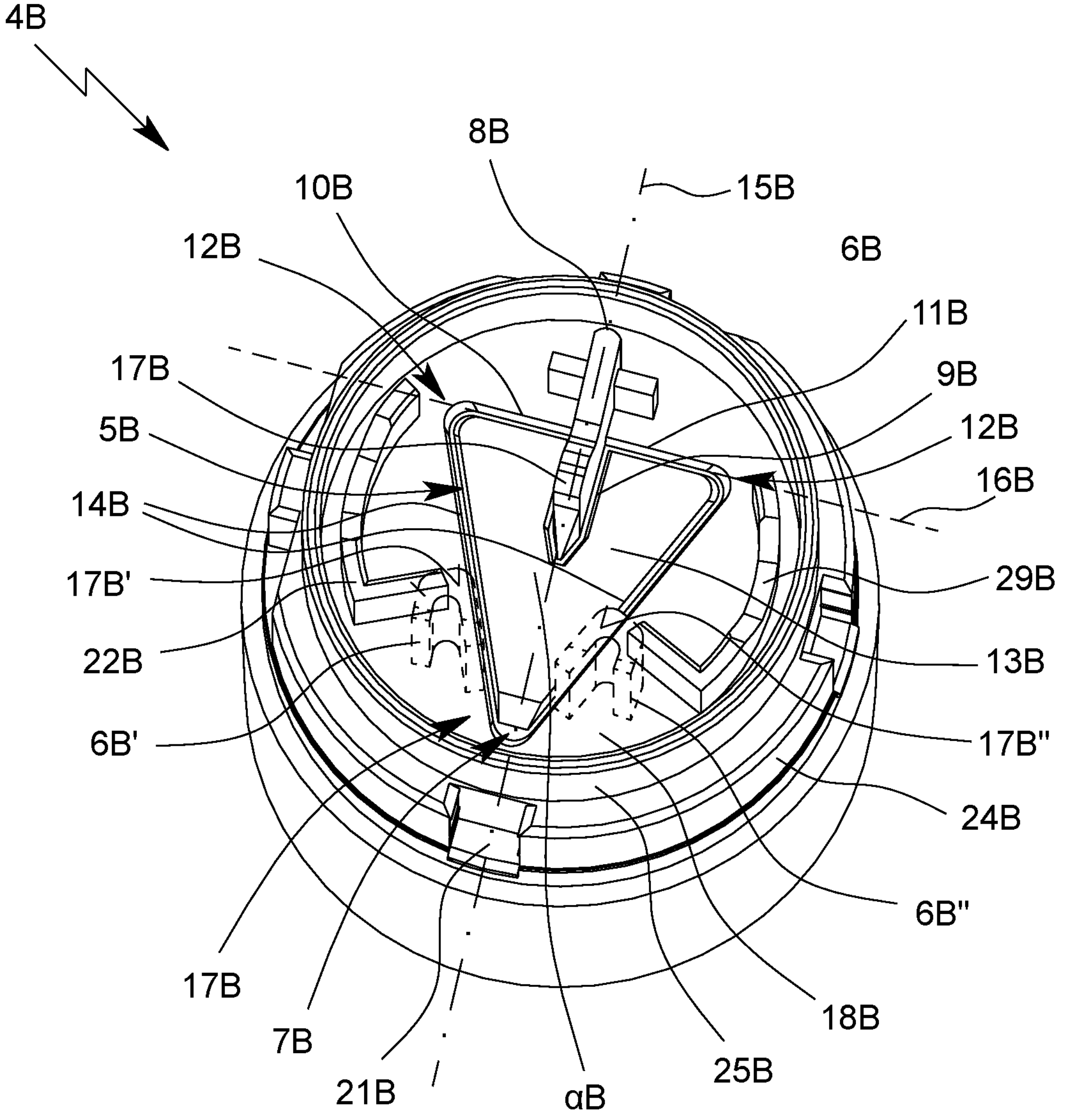
FIG. 3 is a schematic perspective view of a second connection device.

FIG. 1, which is a section through the rams 6A, 6B, clearly shows the shape, the section being taken, in relation to the perspective views from FIGS. 2 and 3, along a sectional plane in which the longitudinal axes 15A, 15B are located and which extends transversely or perpendicularly to the alignment 16A, 16B.

According to the drawing, starting from the splitting element 8B, the ram 6B is in the shape of a wedge and transitions into a groove which separates the splitting element 8A, 8B from the pressure surface 17A, 17B. However, other solutions are also possible in this respect, for example implementing the pressure surface 17A, 17B and the splitting element 8A, 8B separately or in a different shape.

Preferably, however, the shape of the ram 6A, 6B adjacent to the splitting element 8A, 8B is wedge-shaped such that the corresponding transition of the closure element 13A, 13B to the thin point 5A, 5B makes it possible for the splitting element 8A to directly strike the thin point 5A, 5B during the coupling process, without being supported previously on the closure element 13A, 13B.

The pressure surface 17A is arranged and designed such that force can be applied to the opposite closure element 13B of the other closure device 4B in a more central manner than would be possible using the splitting element 8A. The pressure surface 17A is thus preferably arranged more centrally than the splitting device 8A, meaning that the splitting device 8A can produce the initial rupture to the thin point 5B and the pressure surface 17A applies the force to the closure element 13B during the further opening process, thereby lifting the closure element 13B off the splitting device 8A.

The ram 6A is preferably stationary. In particular, the ram 6A is held in a stationary manner on a side of the thin point 5A facing away from the closure element 13A. In other words, the ram 6A is preferably rigidly connected to the base or wall of the container 3A. As a result, the ram does not move relative to the wall of the container 3A during the coupling process. This leads to stability that allows for the necessary pressure for opening the connection devices 4A, 4B.

Once coupling is complete, the ram 6A, which was previously surrounded by the portion 9A of the thin point 5A, preferably protrudes into the formed opening 19A. This is explained in more detail below on the basis of FIG. 4, which is a schematic section through the proposed connection devices 4A, 4B after the coupling process has been completed. In this case, the closure devices 13A, 13B have each been pushed open by the ram 6A, 6B of the other or opposite connection device 4A, 4B, thereby forming the openings 19A, 19B. Consequently, a continuous fluid passage between the inner chambers 2A, 2B of the containers 3A, 3B is produced.

The coupling process starts from the position of the containers 3A, 3B or connection devices 4A, 4B as shown in FIG. 1, in that the connection devices 4A, 4B are moved linearly towards one another and/or into one another axially or along a coupling axis 20A, 20B. In this case, the coupling axis 20A, 20B preferably corresponds to central axes or axes of symmetry of the containers 3A, 3B and/or of the connection devices 4A, 4B.

As explained above, the aforementioned aspects preferably also apply to the other connection device 4A, 4B. Specifically, the connection devices 4A, 4B are preferably formed so as to be complementary to one another and/or are similar.

In this case, therefore, the two connection devices 4A, 4B each have a thin point 5A, 5B and a ram 6A, 6B, the thin points 5A, 5B each being designed to rupture or be ruptured through the application of force by the ram 6A, 6B of the other connection device 4A, 4B, as a result of which the fluid connection can be produced by opening the two containers 3A, 3B, which were previously sealed separately.

The closure elements 13A, 13B, thin points 5A, 5B and/or rams 6A, 6B therefore preferably have at least substantially the same shape and each act in a reciprocal manner on corresponding points of the other connection device 4A, 4B during the coupling process. As a result, the containers 3A, 3B open simultaneously and reciprocally in the region of the connection devices 4A, 4B during the coupling process.

The connection devices 4A, 4B preferably have thin points 5A, 5B that extend in a similar manner, and rams 6A, 6B at corresponding positions, such that the splitting devices 8A, 8B act on the tip 7A, 7B of the thin point 5A, 5B of the other connection device 4A, 4B, meaning that the two thin points 5A, 5B both rupture at least substantially simultaneously in the region of the tip 7A, 7B. The opening process for the connection devices 4A, 4B thus takes place by means of relative movement at least substantially simultaneously with and identically to corresponding, identically formed means, by the connection devices 4A, 4B reciprocally applying force to one another.

Preferably, the connection devices can only be coupled together by moving along the coupling axis 20A, 20B, which, as mentioned, preferably forms a central axis of the containers 3A, 3B and/or a central axis of the connection devices 4A, 4B, when they are in a predefined orientation relative to one another. For this purpose, the connection devices 4A, 4B preferably comprise complementary or corresponding guides 21A, 21B, 22A, 22B which allow the containers 3A, 3B to be coupled together only when they are in a or the predefined orientation relative to one another and do not allow them to be coupled together when they are oriented differently.

By way of example, and as can be seen particularly clearly in FIGS. 2 and 3, grooves are provided as guides 21A and ridges as guides 21B; these correspond to one another such that an orientation of the connection devices 4A, 4B relative to one another is fixed.

In the example shown, corresponding grooves and ridges are each located on the periphery of the connection devices 4A, 4B on the outer peripheral line of the second connection device 4B in the example. These grooves and ridges, or other fundamentally possible orientation devices, constrain the aforementioned orientation. In this orientation, the splitting elements 8A, 8B strike the tips 7A, 7B of the thin points 5A, 5B during a coupling movement. In addition, the rams 6A, 6B are preferably located in a common plane in terms of their main extensions, but they do not collide with one another during a coupling movement along the coupling axis 20A, 20B. In addition, the thin points 5A, 5B preferably extend in a mirror image or inverse to one another.

In other words, in the predefined orientation, projections of the thin points 5A, 5B extend along the coupling axis 20A, 20B in a mirror image to one another and/or projections of the rams 6A, 6B are offset from one another along the coupling axis 20A, 20B so as to not be in contact at least substantially. During a coupling movement of the connection devices 4A, 4B towards one another, the rams 6A, 6B thus slide past one another without touching, at least until an opening is formed or the fluid connection is established.

The connection devices 4A, 4B can preferably be inserted into one another exclusively linearly or axially. In this case, the connection devices 4A, 4B or containers 3A, 3B comprising said devices can be inserted or slid into one another along the coupling axis 20A, 20B shown in FIG. 1.

In this case, the rotational orientation of the containers 3A, 3B or connection devices 4A, 4B relative to one another in relation to the coupling axis 20A, 20B is preferably pre-set by the guide means 21A, 21B. Additional guide means 22A, 22B are implemented in the form of ridges comprising a curved portion that is concentric with the coupling or central axis, and a second portion extending at least substantially radially.

These additional guide means 22A, 22B of the connection devices 4A, 4B are preferably arranged and designed such that, during the coupling process, the additional guide means 22A, 22B abut one another and are thus brought together. The radially extending portions can be designed to prevent the connection devices 4A, 4B from moving towards one another along the coupling axis 20A, 20B when in an orientation that is rotated 180° about the coupling axis 20A, 20B compared with the pre-set orientation or predefined orientation.

Furthermore, the containers 3A, 3B in the example shown are formed as bottles, particularly preferably as vials. This is advantageous in that the mixture, formed by the connection devices 4A, 4B, of the substances S1, S2 that are held in the inner chambers 2A, 2B of the containers 3A, 3B and mixed once the fluid connection is established can be removed in the conventional manner.

At least one of the containers 3A, 3B preferably has a removal opening 23A, 23B, which is formed by a septum in the example shown. In the example shown, the two containers 3A, 3B are each provided with a removal opening 23A, 23B in addition to the connection devices 4A, 4B. This is not compulsory, however. It is also possible for different removal openings 23A, 23B to be provided.

For example, a septum in the form of a sealed removal opening 23A, 23B can be pierced by means of an injection needle not shown in order to remove the contents, i.e. the mixture of the contents of the containers 3A, 3B, in particular in part or gradually dose by dose.

In one variant, the removal openings 23A, 23B can be suitable for being inserted into an injector, such as an autoinjector or a self-filling syringe, the mixture of the contents of the containers 3A, 3B being removed automatically through at least one removal opening 23A, 23B.

The connection devices 4A, 4B are preferably designed to create a seal that is tight with respect to the surroundings, particularly preferably an air-tight, liquid-light and/or sterile seal, in particular a bacteria-tight seal.

In the example shown, the connection devices 4A 4B are suitable for forming, during the coupling, a passage that is suitably tight with respect to the surroundings due to sealing devices 24A, 24B that match one another, in particular sealing portions of the connection devices 4A, 4B that are formed integrally with the base 18A, 18B, the thin point 5A, 5B and/or the closure element 13A, 13B. In the example shown, the sealing devices 24 are wall portions, peripheral sealing surfaces, sealing lips and/or preferably peripheral ridges that correspond to one another such that a suitable seal is produced when they are slid into one another. Alternatively or additionally, it is also possible to provide other sealing means, such as sealing rings, that are placed or arranged between the connection devices 4A, 4B during the coupling such that the connection devices 4A, 4B are sealed with respect to one another, as a result of which a passage that is tight with respect to the surroundings is formed or provided between the containers 3A, 3B or the inner chambers 2A, 2B thereof.

In the region of the sealing devices 24A, 24B, the connection devices 4A, 4B preferably comprise securing means for holding the connection devices 4A, 4B against one another during or after coupling. In particular, these securing means are latching means for latching the connection devices 4A, 4B together as a result of the coupling, preferably in an unreleasable manner.

Figure 4:
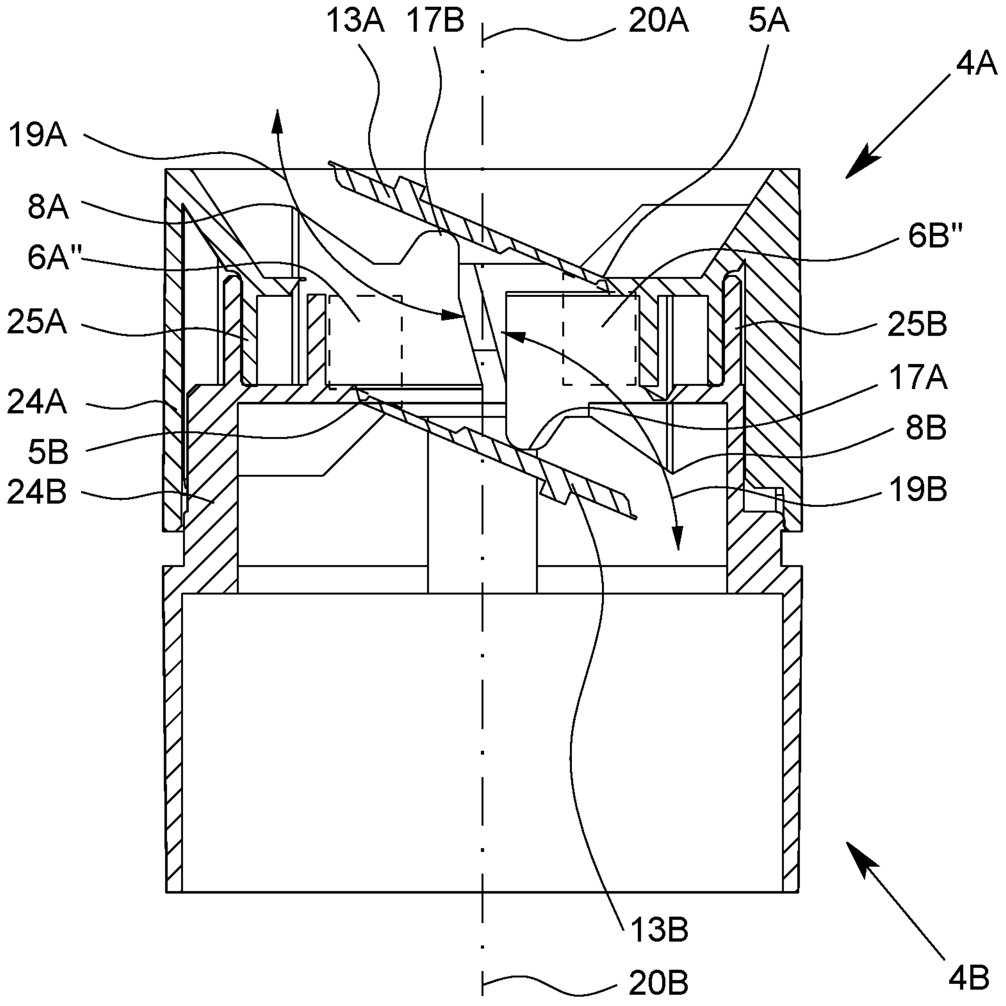
FIG. 4 is a schematic section through the connection devices arranged relative to one another after coupling and with the fluid connection established.
Figure 5:
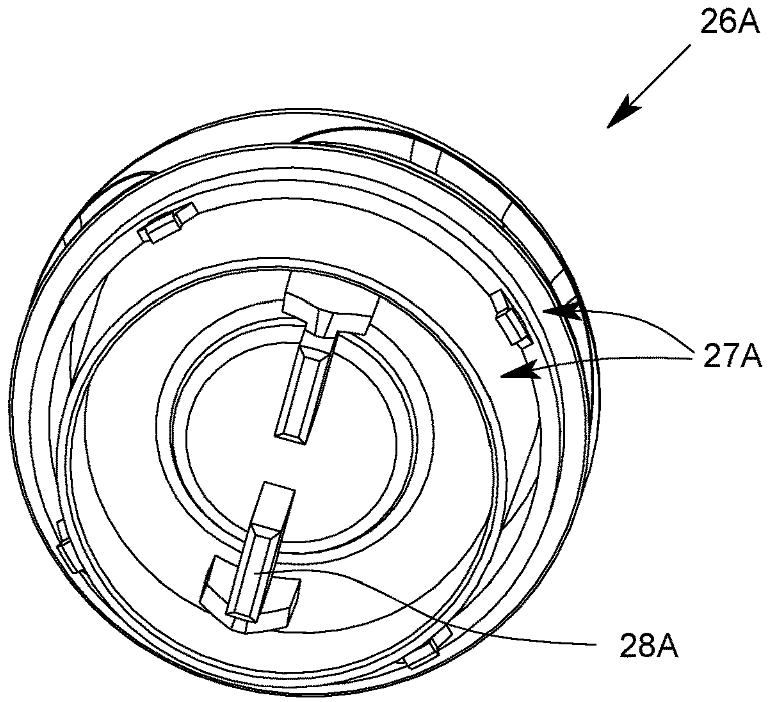
FIG. 5 is a perspective view of a cover cap for the first connection device.
Figure 6:
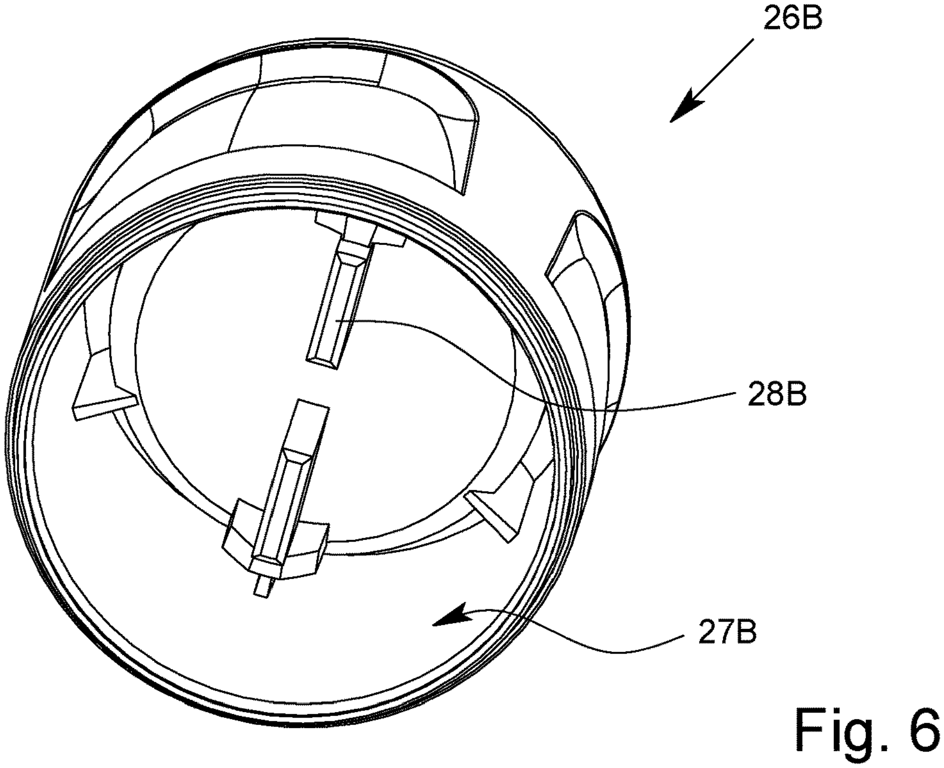
FIG. 6 is a perspective view of a cover cap for the second connection device.

FIG. 4 shows clearly the sealing devices 24A, 24B that tightly abut one another around the periphery. It can also be seen that a double seal is preferably produced by outer walls sealingly abutting one another when in the connected state, and additionally by a second sealing plane being formed by annular, abutting sealing collars 25A, 25B. The sealing collars 25A, 25B are preferably formed by at least substantially annularly about the coupling axis 20A, 20B. The sealing collars 25A, 25B are preferably formed by at least substantially annularly about the coupling axis 20A, 20B. The sealing collars 25A, 25B preferably each form part of one of the connection devices 4A, 4B. In addition, the sealing collars 25A, 25B are designed such that, during coupling, the radially inner side of one of the sealing collars 25A, 25B comes into contact with or abuts the radially outer side of the other sealing collar 25A, 25B in such a way as to produce a seal. The sealing collars 25A, 25B can preferably be slid into one another in the manner of a sleeve, said collars being designed such that, when they completely abut one another peripherally, a space that is surrounded by the sealing collars 25A, 25B and preferably forms the passage once the opening is produced is sealed. The sealing collars 25A, 25B are preferably each formed integrally with the base 18A, 18B, the thin point 5A, 5B and/or the closure element 13A, 13B.

Another aspect of the present invention relates to one or more caps 26A, 26B for covering or closing, preferably in a sterile manner, the each connection device 4A, 4B.

The caps 26A, 26B is/are preferably formed so as to complement the connection devices 4A, 4B such that the same sealing devices 24A, 24B are used at least in part in order to sealingly connect the cap 26A, 26B to the connection device 4A, 4B such as to prevent a combination of thin point 5A, 5B, ram 6A, 6B and/or closure element 13A, 13B.

The caps 26A, 26B thus each comprise sealing surfaces 26A, 26B that preferably complement the sealing devices 24A, 24B and/or sealing collars 25A, 25B.

The caps 26A, 26B preferably comprises guide devices 28A, 28B that are formed so as to match or complement the guides 22A, 22B of the connection devices 4A, 4B in such a way that, when the cap 26A, 26B is placed on, the cap 26A, 26B can be levered off by rotation relative to the connection device 4A, 4B.

In the specific example, this is achieved by the guide devices 28A, 28B being ridges that are designed to abut, on their end face, a guide surface 29A, 29B of the connection devices 4A, 4B. On their end faces, the guides 22A, 22B preferably comprise the guide surfaces 29A, 29B, which interact with the guide devices 28A, 28B during rotation such as to lever off the cap 26A, 26B by rotation relative to the connection device 4A, 4B about the coupling axis 20A, 20B or a central axis shared by the cap 26A, 26B and the connection device 4A, 4B.

Together with the guide surfaces 29A, 29B, the guide devices 28A, 28B thus preferably forms a lever mechanism for levering off the cap 26A, 26B by rotating the cap 26A, 26B relative to the connection device 4A, 4B.

Figure 7:
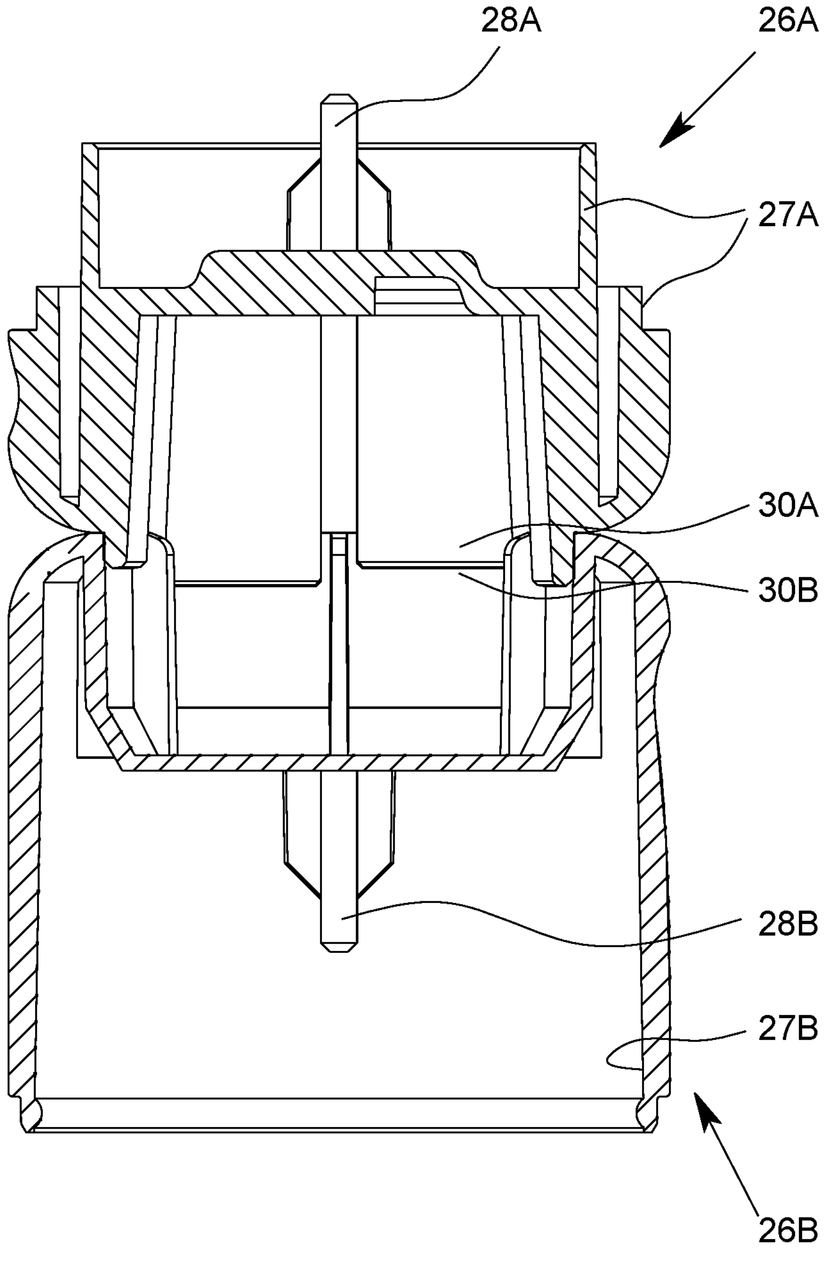
FIG. 7 is a schematic section through the cover caps according to FIGS. 5 and 6 inserted into one another.

FIG. 7 shows the caps 26A, 26B in this case without the connection devices 4A, 4B as inserted into one another when being transported. For this purpose, the caps 26A, 26B optionally comprise end plug elements 30A, 30B that match one another and allow the caps 26A, 26B to be held against one another at their bases, preferably in a clamped and/or latched manner. In this way, the connection devices 4A, 4B or containers 3A, 3B can be held against one another, for transport and before the fluid connection is established, by means of caps 26A, 26B placed thereon. As a result, confusion is prevented, for example, if more than one container system 1 is being used at the same time.

In the example shown, the guide devices 28A, 28B are formed so as to complement or match the additional guides 22A, 22B, in particular the radially extending portions thereof, such that the additional guides 22A, 22B, in particular the radially extending portions thereof, limit a rotational movement of the each cap 26A, 26B so as to prevent collision with the rams 6A, 6B. In particular, the each additional guide 22A, 22B forms a stop for the each guide device 28A, 28B.

In an aspect that can also be implemented independently, the present invention also relates to a container 3A, 3B for a proposed container system 1. In an initial state, i.e. before coupling, the containers 3A, 3B of the container system 1 are preferably separate, provided separately or can at least be separated from one another. In this context, the present aspect relates to one of the containers 3A, 3B.

Another aspect of the present invention that can also be implemented independently relates to the use of the proposed container system 1 for producing a medicinal product, in particular a combination vaccine.

In this case, the first container 3A comprises a first substance S1 in its inner chamber 2A, in particular a first vaccine against a first illness, and a second container 3B of the container system 1 comprises a second substance S2, in particular a second vaccine against a second illness different from the first. Furthermore, the two containers 3A, 3B each comprise a connection device 4A, 4B which is used in the proposed use for establishing a fluid connection between the containers 3A, 3B, thereby interconnecting the inner chambers 2A, 2B of the containers 3A, 3B for fluid communication so as to mix the substances S1, S2. As a result, if the two substances S1, S2 are both vaccines, a combination vaccine can be formed.

It is also preferable for at least one substance S1, S2 arranged in the inner chamber 2A, 2B to comprise a pharmaceutical active ingredient and for a drug to be formed by the substances S1, S2 being mixed as a result of the transfer of the substances S1, S2 through the fluid connection. In this way, a medicinal product, in particular a combination vaccine, can be produced immediately before it is used, which is particularly advantageous in cases where the result, i.e. the mixed substances, is not stable for long periods of time.

Another aspect of the present invention that can also be implemented independently relates to the use of a preferred proposed container system 1 for producing and/or providing a vaccine, in particular for immunizing against porcine circovirus disease PCVD and/or enzootic pneumonia EP, or infections with porcine circovirus and/or infection with bacteria of the *mycoplasma* strain, in particular *Mycoplasma hyopneumoniae*, preferably for immunizing against the porcine circovirus disease PCVD and enzootic pneumonia EP or against infections with porcine circovirus, in particular porcine circovirus type 2, and infection with bacteria of the *mycoplasma* strain, in particular *Mycoplasma hyopneumoniae*.

For this purpose, a first proposed container 3A can comprise a first starting material as a first substance S1 and a second proposed container 3B can comprise a second starting material as a second substance S2. The starting materials can be vaccines against different illnesses or the starting materials can comprise vaccines against different illnesses.

It is particularly preferable for the first starting material to comprise just one first component out of *mycoplasma* vaccine or *mycoplasma* antigen and circovirus vaccine or circovirus antigen and optionally additional substances. The first starting material can thus comprise *mycoplasma* vaccine or one or more *mycoplasma* antigens, or alternatively comprise circovirus vaccine or one or more circovirus antigens. The first starting material is preferably separated from the second starting material, in particular if the starting materials are not stable for long periods of time when together. The second starting material merely comprises the other component out of *mycoplasma* vaccine or one or more *mycoplasma* antigens and circovirus vaccine or one or more circovirus antigens and optionally additional substances. Therefore, if the first starting material comprises *mycoplasma* vaccine or one or more *mycoplasma* antigens, the second starting material comprises circovirus vaccine or one or more circovirus antigens, or vice versa.

The *mycoplasma* vaccine may comprise attenuated and/or deactivated bacteria, bacteria fragments or recombinant portions of *Mycoplasma hyopneumoniae*, but comprises at least one or more *Mycoplasma hyopneumoniae* antigens. Preferably, the *Mycoplasma hyopneumoniae* antigen originates from strain J *Mycoplasma hyopneumoniae*, or the deactivated *Mycoplasma hyopneumoniae* bacteria are J strain bacteria. In addition, the *mycoplasma* vaccine can be one of the following vaccines, or the *Mycoplasma hyopneumoniae* antigen can be the antigens contained in one of the following vaccines: Ingelvac®MycoFlex Boehringer Ingelheim Vetmedica Inc, St Joseph, Mo., USA, Porcilis M. hyo, Myco Silencer® BPM, Myco Silencer® BPME, Myco Silencer® ME, Myco Silencer® M, Myco Silencer® Once, Myco Silencer® MEH all from Intervet Inc., Millsboro, USA, Stellamune *Mycoplasma* Pfizer Inc., New York, N.Y., USA, Suvaxyn *Mycoplasma*, Suvaxyn M. hyo, Suvaxyn MH-One all formerly Fort Dodge Animal Health, Overland Park, Kans., USA, now Pfizer Animal Health.

The circovirus vaccine may comprise attenuated and/or deactivated porcine circovirus, preferably type 2, in particular the OFR2 protein of type 2. It is particularly preferable to use recombinantly expressed OFR2 protein of porcine circovirus type 2, preferably expressed in and obtained from in vitro cell culture. Examples of OFR2 proteins from porcine circovirus type 2 are described in International Patent Application Publication WO 2006/072065 A2, as well as in other documents. These proteins have proven particularly advantageous for effective vaccination. In addition, the circovirus vaccine can be one of the following vaccines, or the circovirus antigen can be the antigens contained in one of the following vaccines: Ingelvac®CircoFLEX, Boehringer Ingelheim Vetmedica Inc, St Joseph, Mo., USA, CircoVac® Merial SAS, Lyon, France, CircoVent Intervet Inc., Millsboro, Del., USA, or Suvaxyn PCV-2 One Dose® Fort Dodge Animal Health, Kansas City, Kans., USA.

If it contains the OFR2 protein, the circovirus vaccine preferably contains between 2 μg and 150 μg, preferably between 2 μg and 60 μg, more preferably between 2 μg and 50 μg, more preferably between 2 μg and 40 μg, more preferably between 2 μg and 30 μg, more preferably between 2 μg and 25 μg, more preferably between 2 μg and 20 μg, more preferably between 4 μg and 20 μg, more preferably between 4 μg and 16 μg OFR2 protein per dose to be administered. The circovirus vaccine is preferably produced and prepared such that 1 ml of the vaccine corresponds to a dose of 1. In particular, the circovirus vaccine can comprise OFR2 protein in amounts greater than 2 μg/ml, preferably greater than 4 μg/ml and/or less than 150 μg/ml, preferably less than 60 μg/ml, 50 μg/ml, 40 μg/ml, 30 μg/ml or 25 μg/ml, in particular less than 20 μg/ml. This is conducive to reliable application.

If it contains deactivated *mycoplasma* bacteria, preferably deactivated *Mycoplasma hyopneumoniae* bacteria, the *mycoplasma* vaccine preferably contains between $10^3$ and $10^9$ colony forming units CFU, preferably between $10^4$ and $10^8$ CFU, more preferably between $10^5$ and $10^6$ CFU per dose to be administered, the appropriate CFU level being set before the bacteria are deactivated. The *mycoplasma* vaccine is preferably produced and prepared such that 1 ml of the vaccine corresponds to a dose of 1. In particular, the *mycoplasma* vaccine can comprise more than $10^3$ CFU/ml, preferably more than $10^4$ CFU/ml, in particular more than $10^5$ CFU/ml and/or less than $10^9$ CFU/ml, preferably less than $10^8$ CFU/ml, in particular less than $10^7$ CFU/ml or $10^6$ CFU/ml deactivated *mycoplasma* bacteria, preferably deactivated *Mycoplasma hyopneumoniae* bacteria, in particular before the bacteria are deactivated.

At least one of the starting materials and/or the vaccine or combination vaccine can comprise an adjuvant, preferably a polymer adjuvant, in particular carbomer. Preferably, at least or precisely one of the two starting materials, preferably both starting materials, contains an amount of adjuvant of from 500 μg to 5 mg, preferably from 750 μg to 2.5 mg, more preferably from approximately 1 mg adjuvant per dose to be administered. The starting materials are preferably produced and prepared such that 1 ml of the starting material corresponds to a dose of 1. The use of an adjuvant, preferably a polymer adjuvant such as carbomer, has proven particularly advantageous in relation to immunization efficacy and duration of action. However, it is possible use alternative and/or additional adjuvants.

In a further embodiment shown in the FIGS. 1 to 4 using dashed lines, alternative or additional rams 6A', 6B', 6A", 6B", having pressure surfaces 17A', 17B', 17A", 17B", can be provided for pushing the closure element 13A, 13B of the opposite connection device 4A, 4B facing away from the alternative or additional rams 6A', 6B', 6A", 6B" in an opening direction.

The function of said alternative or additional rams 6A', 6B', 6A", 6B" or alternative or additional pressure surfaces 17A', 17B', 17A", 17B" is similar to that of previously described rams 6A, 6B such that reference is made to the previous description. However, the alternative or additional rams 6A', 6B', 6A", 6B" preferably do not have a splitting device but are merely configured for continued pushing open the closure element 13A, 13B which alternatively or additionally can be conducted by the pressure surface 17A, 17B as previously described.

The previously described pressure surface 17A, 17B can, thus, be either avoided or reduced in height relative to an opening area of the respective connection device 4A, 4B, or can simply be the same or similar as previously discussed.

In the depicted embodiment, the alternative or additional rams 6A', 6B', 6A", 6B" are located besides the thin point 5A, 5B close to the corner 12A, 12B, and have a shape such that during connecting the connection devices 4A, 4B, the alternative or additional rams 6A', 6B', 6A", 6B" with progressed movement of the connection devices 4A, 4B along the coupling axis 20A, 20B towards each other come into contact with the closure element 13A, 13B of the other/opposing connection device 4A, 4B after the thin point 5A, 5B has been initially ruptured by means of the splitting device 8A, 8B such that the closure element 13A, 13B is moved in opening direction so as to opening the connection device 4A, 4B for achieving a larger opening cross section.

The alternative or additional rams 6A', 6B', 6A", 6B" preferably are realized in form of bars which extend essentially perpendicular to a plane in which the thin point 5A, 5B or the closure element 13A, 13B is or are arranged at least in an initial position where the connection device 4A, 4B is still closed.

The alternative or additional rams 6A', 6B', 6A", 6B" preferably are arranged and shaped such that pressure surfaces 17A', 17B', 17A", 17B", which can be formed by their open end faces, act on the closure element 13A, 13B of the other/opposing connection device 4A, 4B, i.e., of the connection device 4A, 4B at which the respective alternative or additional ram 6A', 6B', 6A", 6B" is not fixed.

The additional or alternative rams 6A', 6B', 6A", 6B" preferably are fixedly positioned at the side of the thin point 5A, 5B facing away from the closure element 13A, 13B. In particular, the alternative or additional rams 6A', 6B', 6A", 6B" are fixed to or connected in one piece with a housing or mounting part surrounding the thin point 5A, 5B.

Further aspects of the invention are:

1. Container system 1 comprising at least two containers 3A, 3B each forming inner chambers 2A, 2B, the containers 3A, 3B each comprising a connection device 4A, 4B, specifically a first connection device 4A of a first container 3A and a second connection device 4B of a second container 3B, and the connection devices 4A, 4B being able to be coupled together such that the coupling produces a continuous fluid connection that is closed off from the surroundings and interconnects the inner chambers 2A, 2B of the containers 3A, 3B such that contents that can be held in the inner chambers 2A, 2B can be mixed, the first connection device 4A comprising a thin point 5A designed to rupture through the application of force by a ram 6B of the second connection device 4B, as a result of which the fluid connection can be established, wherein in its shape, the thin point 5A comprises a tip 7A between two at least substantially straight legs 14A and in that the ram 6B comprises a splitting device 8B that is designed and arranged such as to rupture the thin point 5A by acting on the tip 7A when the coupling is produced; and/or
   - in that the first connection device 4A comprises both the thin point 5A and a ram 6A for acting on a thin point 5B of the second connection device 4B, the thin point 5A of the first connection device 4A comprising a portion 9A that surrounds part of the ram 6A of the first connection device 4A; and/or
   - in that the connection devices 4A, 4B each comprise a closure element 13A, 13B delimited by a peripheral thin point 5A, 5B and each comprise a ram 6A, 6B having a splitting device 8A, 8B and a pressure surface 17A, 17B produced separately therefrom:
   - the splitting device 8A of the first connection device 4A being arranged and designed such as to act on the thin point 5B of the second connection device 4B when the coupling is produced such that said thin point ruptures,
   - the splitting device 8B of the second connection device 4B being arranged and designed such as to act on the thin point 5A of the first connection device 4A when the coupling is produced such that said thin point ruptures,
   - the pressure surface 17A of the first connection device 4A being arranged and designed to push open the closure element 13B of the second connection device 4B when the coupling is produced, and
   - the pressure surface 17B of the second connection device 4B being arranged and designed to push open the closure element 13A of the first connection device 4A when the coupling is produced.
2. Container system according to aspect 1, characterized in that straight, aligned portions 10A, 11A of the thin point 5A adjoin different sides of the ram 6A.
3. Container system according to aspect 2, characterized in that the aligned portions 10A, 11A of the thin point 5A form a film hinge by which the closure element 13A is pivotally mounted after the thin point 5A ruptures.
4. Container system according to any of the preceding aspects, characterized in that the aligned portions 10A, 11A are arranged on a side facing away from the tip 7A and/or the aligned portions 10A, 11A and the tip 7A are arranged on opposite sides.
5. Container system according to any of the preceding aspects, characterized in that, once coupling is complete, the portion 9A of the ram 6A that was originally surrounded by the thin point 5A protrudes into an opening 19A formed as a result of the coupling.
6. Container system according to any of the preceding aspects, characterized in that, apart from in the region around the ram 6A, the thin point 5A extends in a polygonal manner, preferably having an odd number of corners 12A, 12B, particularly preferably in an at least substantially triangular manner.
7. Container system according to any of the preceding aspects, characterized in that the thin point 5A at least substantially fully surrounds a preferably plate-like closure element 13A, the connection devices 4A, 4B preferably being designed such that, upon coupling, the ram 6B of the second connection device 3B acts on the closure element 13A of the first connection device 4A in such a way that the thin point 5A ruptures along two legs 14A of the shape of the thin point 5A starting from the tip 7A.

8. Container system according to any of the preceding aspects, characterized in that the ram 9A is formed by a ridge having an elongate cross section, the longitudinal axis 15A of which extends transversely to the alignment 16A of the aligned portions 10A, 11A, and/or the ridge having, on an open end face, a V-shaped contour that has two open ends that form the splitting device 8A on one end and, on the other end, a pressure surface 17A for pushing open the closure element 13B of the second connection device 4B.

9. Container system according to any of the preceding aspects, characterized in that the ram 6A is held in a stationary manner on a side of the thin point 5A facing away from the closure element 13A.

10. Container system according to any of the preceding aspects, characterized in that the connection devices 4A, 4B are formed so as to complement one another and/or are similar, the two connection devices 4A, 4B preferably each having a thin point 5A, 5B and a ram 6A, 6B, the thin points 5A, 5B each being designed to rupture through the application of force by the ram 6A, 6B of the other connection device 4A, 4B, as a result of which the fluid connection can be established by opening the two containers 3A, 3B, which were previously sealed separately.

11. Container system according to any of the preceding aspects, characterized in that the connection devices 4A, 4B comprise thin points 5A, 5B that extend in a similar manner to one another and the rams 6A, 6B at corresponding positions.

12. Container system according to any of the preceding aspects, characterized in that the connection devices 4A, 4B can be coupled together by moving along a coupling axis 20A, 20B, which preferably forms a central axis of the containers 3A, 3B and/or connection devices 4A, 4B, only when they are in a predefined orientation relative to one another, the connection devices 4A, 4B preferably comprising complementary guides 21A, 21B, 22A, 22B which allow the containers 3A, 3B to be coupled together only when they are in a predefined orientation relative to one another and do not allow them to be coupled together when they are oriented differently.

13. Container system according to aspect 12, characterized in that, in the predefined orientation, projections of the thin points 5A, 5B extend along the coupling axis 20A, 20B in a mirror image to one another; and/or in that, in the predefined orientation, projections of the rams 6A, 6B are offset from one another along the coupling axis 20A, 20B so as not to be in contact.

14. Use of a container system 1 according to any of the preceding aspects, wherein a first container 3A comprises a first substance S1, in particular a first vaccine against a first illness, wherein a second container 3B comprises a second substance S2, in particular a second vaccine against a second illness different from the first, wherein at least one of the containers 3A, 3B comprises a removal opening 23A, 23B and the containers 3A, 3B each comprise the connection device 4A, 4B for establishing a fluid connection between the containers 3A, 3B, to produce a substance mixture, in particular to produce a combination vaccine for simultaneously vaccinating against different illnesses, wherein the containers 3A, 3B are brought into fluid communication with one another by means of the connection devices 4A, 4B in such a way that the substances S1, S2 are mixed, in particular such as to form the combination vaccine.

15. Container 3A, 3B for a container system 1 comprising two containers 3A, 3B, wherein the containers 3A, 3B each comprise a connection device 4A, 4B, the connection devices being separate from one another, wherein the connection devices 4A, 4B can be coupled together by moving towards one another along a coupling axis 20A, 20B in such a way that the coupling produces a continuous fluid connection that is closed off from the surroundings and interconnects the inner chambers 2A, 2B of the containers 3A, 3B such that contents that can be held in the inner chambers 2A, 2B can be mixed, wherein the container 3A, 3B comprises a guide 22A, 22B that allows the containers 3A, 3B to be coupled together only when they are in a predefined orientation relative to one another and does not allow them to be coupled together when they are oriented differently, and wherein the container 3A, 3B is covered by a cap 26A, 26B, wherein the guide 22A, 22B prevents or limits a rotational movement of the cap 26A, 26B and/or wherein the guide 22A, 22B forms a guide surface over which the cap 26A, 26B can be or is moved away from the container 3A, 3B by the cap 26A, 26B being rotated relative to the container 3A, 3B.

16. Container system 1 comprising at least two containers 3A, 3B each forming an inner chamber 2A, 2B,

- the containers 3A, 3B each comprising a connection device 4A, 4B being initially closed, specifically a first connection device 4A of a first container 3A and a second connection device 4B of a second container 3B, and
- the connection devices 4A, 4B being able to be coupled together such that the coupling produces a continuous fluid connection that is closed off from the surroundings and interconnects the inner chambers 2A, 2B of the containers 3A, 3B such that contents that can be held in the inner chambers 2A, 2B can be mixed,
- the first connection device 4A comprising a thin point 5A designed to rupture through the application of force by a ram 6B of the second connection device 4B, as a result of which the fluid connection can be established,
- wherein the connection devices 4A, 4B comprise guides 21A, 21B, 22A, 22B for guided coupling of the connection devices 4A, 4B, the guides 21A, 21B, 22A, 22B allowing the connection devices 4A, 4B to be coupled only when they are in a predefined orientation relative to one another and/or the guides 21A, 21B, 22A, 22B are configured for guiding the connection devices 4A, 4B, preferably merely, linear during coupling.

17. Container system according aspect 16, characterized in that the connection devices 4A, 4B can only be coupled together by moving along a coupling axis 20A, 20B forming a central axis of the connection devices when they are in the predefined orientation.

18. Container system according to aspect 16 or 17, characterized in that the predefined orientation is fixed.

19. Container system according to any of aspects 16 to 18, characterized in that the guides are complementary or corresponding in a manner that the guides 21A, 21B, 22A, 22B predefine the orientation and do not allow the containers 3A, 3B or connection devices 4A, 4B to be coupled when they are oriented differently.

20. Container system according to any of aspects 16 to 19, characterized in that the guides form a linear guidance preventing rotational movement of the connection devices 4A, 4B relative to each other during coupling of the connection devices 4A, 4B.

21. Container system according to any of aspects 16 to 20, characterized in that the guides 21A, 21B, 22A, 22B are configured for positive guiding by means of a groove or ridge at one of the connection devices 4A, 4B and a complementary part for sliding along the groove or ridge on the other one of the connection devices 4A, 4B.

22. Container system according to any of aspects 16 to 21, characterized in that the orientation is such that the ram 6B of the second connection device 4B impinges the thin point of the first connection device 4A when the connection devices 4A, 4B are connected.

23. Container system according to any of aspects 16 to 22, characterized in that the connection devices 4A, 4B can be coupled together by moving along a coupling axis 20A, 20B, which forms a central axis of the containers 3A, 3B and of the connection devices 4A, 4B, only when they are in the predefined orientation relative to one another, the connection devices 4A, 4B comprising complementary guides 21A, 21B, 22A, 22B which allow the containers 3A, 3B to be coupled together only when they are in the predefined orientation relative to one another and do not allow them to be coupled together when they are oriented differently.

24. Container system according to any of aspects 16 to 23, characterized in that, in the predefined orientation, projections of the thin points 5A, 5B along the coupling axis 20A, 20B extend in a mirror image or inversely to one another.

25. Container system according to any of aspects 16 to 24, characterized in that in the predefined orientation, projections of the rams 6A, 6B are offset from one another along the coupling axis 20A, 20B so as not to be in contact.

The various aspects of the present invention can be implemented in isolation or in combination, and different combinations can be advantageous in their own right.

What is claimed is:

1. Container system comprising:

at least two containers each of which has an inner chamber, wherein a first of the at least two containers has an initially closed first connection device and a second of the at least two containers has an initially closed second connection device, wherein the first and second connection devices are constructed to form a coupling for coupling the first and second container together, the coupling producing a continuous fluid connection that is closed off from surrounding areas and interconnects the inner chambers of the first and second containers to enable contents in the inner chambers to be mixed, wherein the first connection device comprises a thin point that is rupturable by force applied by a ram of the second connection device for establishing the fluid connection, wherein the thin point has a shape that comprises a tip between two at least substantially straight legs, and wherein the ram comprises a splitting device that is constructed and arranged to rupture the thin point by acting on the tip when the coupling is produced.

2. Container system according to claim 1, wherein, once the coupling has been produced, a portion of the ram protrudes into an opening formed by the coupling.

3. Container system according to claim 1, wherein, apart from a region around the ram, the thin point has a polygonal shape.

4. Container system according to claim 3, wherein, apart from the region around the ram, the thin point has an odd number of corners.

5. Container system according to claim 3, wherein, apart from the region around the ram, the thin point has a substantially triangular shape or has a symmetry plane extending through the tip and bisecting an edge of the thin point opposite the tip.

6. Container system according to claim 1, wherein the thin point at least substantially fully surrounds a plate-shaped closure element, and the connection devices are configured such that, upon coupling, the ram of the second connection device acts on the plate-shaped closure element of the first connection device to cause the thin point to rupture along the two legs of the thin point starting from the tip.

7. Container system comprising:

at least two containers, each of which form an inner chamber, wherein a first of the at least two containers has an initially closed first connection device and a second of the at least two containers has an initially closed second connection device, wherein the first and second connection devices are constructed to form a coupling for coupling the first and second container together, the coupling producing a continuous fluid connection that is closed off from surrounding areas and interconnects the inner chambers of the first and second containers to enable contents in the inner chambers to be mixed, wherein the first connection device comprises a thin point that is rupturable by force applied by a ram of the second connection device for establishing the fluid connection and a ram for acting on a thin point of the second connection device, the thin point of the first connection device comprising a portion that surrounds part of the ram of the first connection device, and wherein each of the rams comprises a splitting device that is constructed and arranged to rupture the respective thin point by acting on the tip when the coupling is produced.

8. Container system according to claim 7, wherein once coupling is complete, the portion of the ram that was originally surrounded by the respective thin point protrudes into an opening formed as a result of coupling of the containers.

9. Container system according to claim 7, wherein, apart from in the region around the ram, the thin points extend in a polygonal manner.

10. Container system according claim 9, wherein apart from in the region around the ram, the thin points have an odd number of corners.

11. Container system according claim 9, wherein, apart from in the region around the ram, each thin point extends in an at least substantially triangular manner or has a symmetry plane through the tip that bisects an edge of the thin point opposite the tip.

12. Container system according to claim 7, wherein each of the thin points are rupturable by the ram of the other connection device, as a result of which the fluid connection can be established between previously separately sealed containers.

13. Container system comprising:

at least two containers, each of which form an inner chamber, wherein a first of the at least two containers has an initially closed first connection device and a second of the at least two containers has an initially closed second connection device, wherein the first and second connection devices are constructed to form a coupling for coupling the first and second container together, the coupling producing a continuous fluid connection that is closed off from surrounding areas and interconnects the inner chambers of the first and second containers to enable contents in the inner chambers to be mixed, wherein the first connection device comprises a thin point that is rupturable by force applied by a ram of the second connection device for establishing the fluid connection and wherein the connection devices comprise guides for guided coupling of the connection devices, the guides at least one of: allow the connection devices to be coupled only when they are in a predefined orientation relative to one another; or are configured for guiding the connection devices linearly during coupling.

14. Container system according claim 13, wherein the connection devices can only be coupled together by moving along a coupling axis forming a central axis of the connection devices when they are in the predefined orientation.

15. Container system according to claim 13, wherein the predefined orientation is such that the ram of the second connection device impinges the thin point of the first connection device when the connection devices are connected.

* * * * *